United States Patent
Conrad et al.

(10) Patent No.: US 9,813,998 B2
(45) Date of Patent: *Nov. 7, 2017

(54) TECHNIQUES FOR ENTERING A LOW-POWER LINK STATE

(75) Inventors: Shaun M. Conrad, Cornelius, OR (US); Robert J. Safranek, Portland, OR (US); Selim Bilgin, Hillsboro, OR (US)

(73) Assignee: Intel Corporation, Santa Clara, CA (US)

( * ) Notice: Subject to any disclaimer, the term of this patent is extended or adjusted under 35 U.S.C. 154(b) by 222 days.

This patent is subject to a terminal disclaimer.

(21) Appl. No.: 13/042,104

(22) Filed: Mar. 7, 2011

(65) Prior Publication Data

US 2011/0161702 A1    Jun. 30, 2011

Related U.S. Application Data

(63) Continuation of application No. 12/685,874, filed on Jan. 12, 2010, now Pat. No. 7,925,954, which is a (Continued)

(51) Int. Cl.
*H04L 1/18* (2006.01)
*H04W 52/28* (2009.01)
(Continued)

(52) U.S. Cl.
CPC .......... *H04W 52/28* (2013.01); *H04L 1/0045* (2013.01); *H04L 1/0057* (2013.01);
(Continued)

(58) Field of Classification Search
CPC ... H04L 1/0045; H04L 1/0057; H04L 1/0061; H04L 5/1438; H04L 5/0055;
(Continued)

(56) References Cited

U.S. PATENT DOCUMENTS 5,042,083 A * 8/1991 Ichikawa ...................... 455/517
5,317,565 A * 5/1994 Crouse et al. ................. 370/354
(Continued)

FOREIGN PATENT DOCUMENTS

| JP | 10-065612 A | * | 3/1998 | ............... H04B 7/26 |
| JP | 10065612 A | * | 3/1998 | ............... H04B 7/26 |

OTHER PUBLICATIONS

Office Action for U.S. Appl. No. 11/480,065, dated Sep. 1, 2009, 7 pgs.
(Continued)

*Primary Examiner* — Albert Decady
*Assistant Examiner* — Osman Alshack
(74) *Attorney, Agent, or Firm* — Patent Capital Group

(57) ABSTRACT

Techniques to cause a point-to-point link between system components to engage in a negotiation process that may lead to the link transitioning from an active state in which data may be transmitted between system components to a low power state where data may not be transmitted. The negotiation process may occur between each pair of nodes within an electronic system that are interconnected via point-to-point link. The negotiation may ensure that there are no pending transactions or transactions that may occur within an upcoming period of time. Through this negotiation each component acknowledges and agrees to transition the link to the low power state.

20 Claims, 4 Drawing Sheets

Related U.S. Application Data continuation of application No. 11/480,065, filed on Jun. 29, 2006, now Pat. No. 7,716,536.

(51) Int. Cl.
*H04L 1/00* (2006.01)
*H04W 52/48* (2009.01)

(52) U.S. Cl.
CPC ......... *H04L 1/0061* (2013.01); *H04W 52/287* (2013.01); *H04W 52/48* (2013.01)

(58) Field of Classification Search
CPC ..... H04L 27/0008; H04L 69/24; G11B 20/18; G06F 13/4265; G06F 15/17337; H03M 13/00
USPC .......................................... 714/748, 750, 746
See application file for complete search history.

(56) References Cited

U.S. PATENT DOCUMENTS

| | | | |
|---|---|---|---|
| 5,359,594 A * | 10/1994 | Gould et al. ................. 370/276 |
| 5,396,636 A * | 3/1995 | Gallagher et al. ............ 713/323 |
| 5,400,322 A * | 3/1995 | Hunt et al. ................... 370/468 |
| 5,408,468 A * | 4/1995 | Petersen ...................... 370/377 |
| 5,410,536 A * | 4/1995 | Shah et al. ................... 370/216 |
| 5,465,398 A * | 11/1995 | Flammer ........................ 455/69 |
| 5,481,738 A * | 1/1996 | Bartow et al. ................ 709/237 |
| 5,493,651 A * | 2/1996 | Crouse et al. ................ 709/237 |
| 5,689,713 A * | 11/1997 | Normoyle et al. ........... 710/263 |
| 5,852,718 A * | 12/1998 | Van Loo ....................... 709/208 |
| 5,978,578 A * | 11/1999 | Azarya et al. ................ 717/100 |
| 5,995,496 A * | 11/1999 | Honkasalo et al. .......... 370/318 |
| 6,021,308 A * | 2/2000 | Kimura ........................... 725/75 |
| 6,357,013 B1 | 3/2002 | Kelly et al. |
| 6,516,442 B1 * | 2/2003 | Wang et al. .................. 714/776 |
| 6,721,355 B1 * | 4/2004 | McClennon et al. ......... 375/222 |
| 6,785,564 B1 | 8/2004 | Quigley et al. |
| 6,954,864 B2 | 10/2005 | Schelling |
| 7,028,197 B2 | 4/2006 | Subramanian et al. |
| 7,362,188 B2 | 4/2008 | Leclercq |
| 7,370,132 B1 * | 5/2008 | Huang et al. ................. 710/307 |
| 7,403,569 B2 * | 7/2008 | Redfern ........................ 375/260 |
| 7,493,228 B2 | 2/2009 | Kwa et al. |
| 7,512,741 B1 * | 3/2009 | Batson et al. ................ 711/141 |
| 7,543,115 B1 * | 6/2009 | Batson et al. ................ 711/141 |
| 7,716,536 B2 | 5/2010 | Conrad et al. |
| 7,925,954 B2 * | 4/2011 | Conrad et al. ................ 714/748 |
| 8,539,260 B2 * | 9/2013 | Bilgin et al. .................. 713/300 |
| 2003/0081603 A1 * | 5/2003 | Rune ............................. 370/390 |
| 2003/0210658 A1 * | 11/2003 | Hernandez et al. .......... 370/311 |
| 2004/0250085 A1 * | 12/2004 | Tattan et al. .................. 713/186 |
| 2004/0266493 A1 * | 12/2004 | Bahl et al. .................... 455/574 |
| 2004/0266494 A1 * | 12/2004 | Ruuska et al. ............... 455/574 |
| 2005/0091421 A1 * | 4/2005 | Odamura .......................... 710/6 |
| 2006/0294427 A1 * | 12/2006 | Glass et al. ...................... 714/31 |
| 2007/0088863 A1 * | 4/2007 | Mannava et al. ............... 710/22 |
| 2007/0094453 A1 * | 4/2007 | Santhanakrishnan et al. ............................. 711/137 |
| 2007/0147332 A1 * | 6/2007 | Lappetelainen et al. ..... 370/346 |
| 2007/0168755 A1 * | 7/2007 | Frodsham et al. .............. 714/43 |
| 2008/0005636 A1 | 1/2008 | Conrad et al. |
| 2008/0019344 A1 * | 1/2008 | Palm et al. ................... 370/338 |
| 2008/0049691 A1 * | 2/2008 | Pulikonda .................... 370/338 |
| 2009/0138641 A1 * | 5/2009 | Adar et al. .................... 710/110 |
| 2010/0115312 A1 | 5/2010 | Conrad et al. |

OTHER PUBLICATIONS

Notice of Allowance for U.S. Appl. No. 11/480,065, dated Dec. 24, 2009, 4 pgs.

Office Action for U.S. Appl. No. 12/685,874, dated Sep. 29, 2010, 7 pgs.

Notice of Allowance for U.S. Appl. No. 12/685,874, dated Dec. 8, 2010, 4 pgs.

* cited by examiner

TECHNIQUES FOR ENTERING A LOW-POWER LINK STATE

This application is a continuation of U.S. patent application Ser. No. 12/685,874, filed Jan. 12, 2010, now U.S. Pat. No. 7,925,954 and entitled, "TECHNIQUES FOR ENTERING A LOW-POWER LINK STATE," which is a continuation of U.S. patent application Ser. No. 11/480,065, filed Jun. 29, 2006, now U.S. Pat. No. 7,716,536 and entitled, "TECHNIQUES FOR ENTERING A LOW-POWER LINK STATE." The disclosures of the prior Applications are considered part of and is incorporated by reference in the disclosure of this Application.

TECHNICAL FIELD

Embodiments of the invention relate to point-to-point link connections within a multi-node system. More specifically, embodiments of the invention relate to techniques for dynamically placing the link in a low power state.

BACKGROUND

In general, the greater the number of circuits operating in a system the greater the power consumption. For a variety of reasons, reduction or minimization of power consumption is frequently a design consideration when implementing an electronic system. Many strategies have been devised to reduce power consumption, most of which involve disabling portions of the system that are not being used. For example, a hard disk may be spun down after a period of inactivity, or a clock signal to a transmission circuit may be disabled after a period of inactivity. While power utilization has improved, further improvements may be made.

BRIEF DESCRIPTION OF THE DRAWINGS

Embodiments of the invention are illustrated by way of example, and not by way of limitation, in the figures of the accompanying drawings in which like reference numerals refer to similar elements.

DETAILED DESCRIPTION

Figure 1:
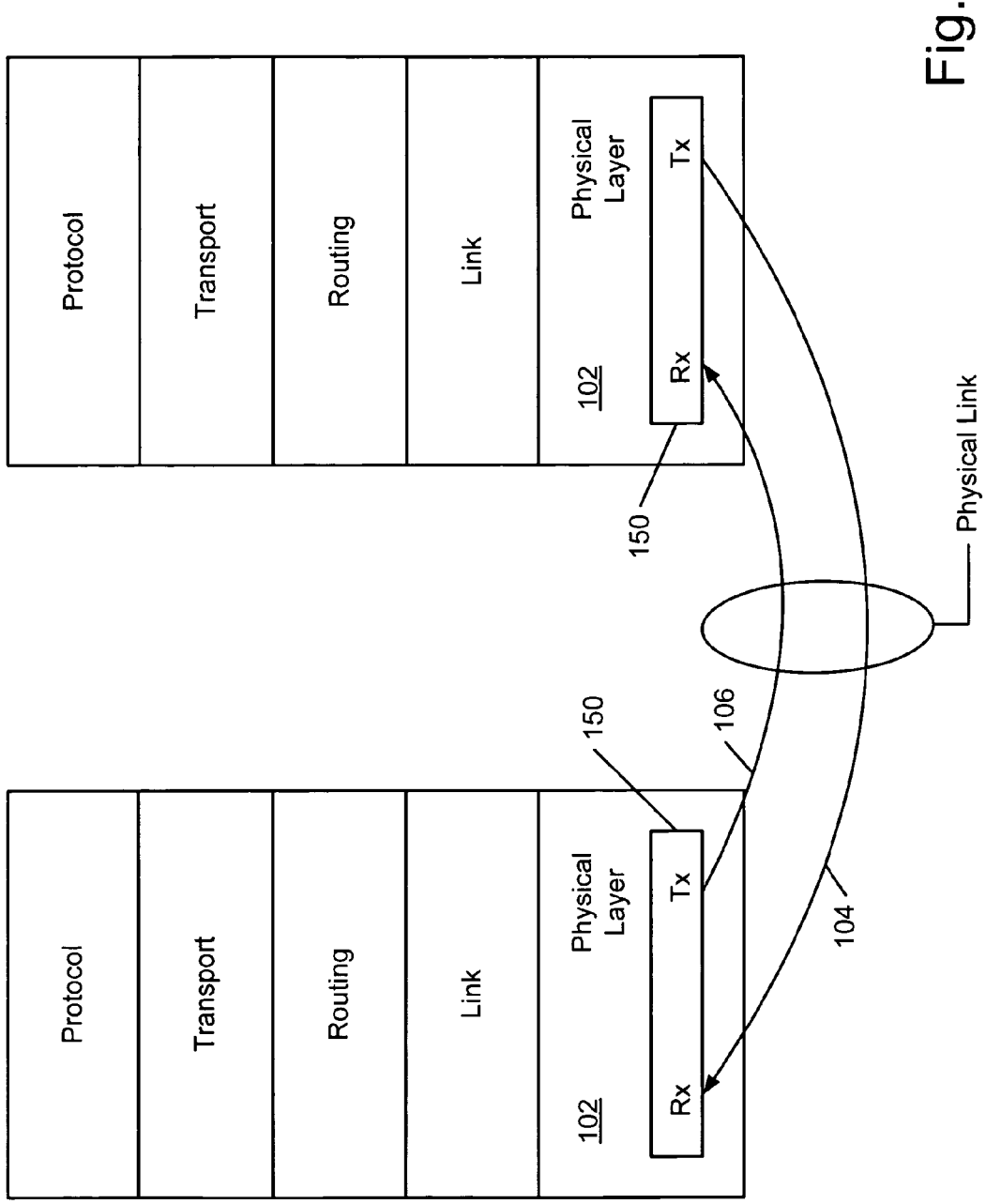
FIG. 1 is a block diagram of one embodiment of an apparatus for a physical interconnect.

In the following description, numerous specific details are set forth. However, embodiments of the invention may be practiced without these specific details. In other instances, well-known circuits, structures and techniques have not been shown in detail in order not to obscure the understanding of this description.

Described herein is a technique to cause a point-to-point link between system components to engage in a negotiation process that may lead to the link transitioning from an active state in which data may be transmitted between system components to a low power state where data may not be transmitted. In one embodiment, in the low power state, power is not applied to the transmit and receive circuits, but a link clock signal may be provided. In an alternate embodiment, power may not be applied to the transmit and receive circuits and the link clock signal may be disabled.

The negotiation process may occur between each pair of nodes within an electronic system that are interconnected via point-to-point link. The negotiation may ensure that there are no pending transactions, or, in one embodiment, transactions that may occur within an upcoming period of time. Through this negotiation each component acknowledges and agrees to transition the link to the low power state.

In one embodiment, assignment to master and slave for a particular point-to-point link may be done by system firmware and stored locally by each component. In alternate embodiments, assignment to master and slave may be accomplished utilizing other techniques. For each link there is only one master and only one slave. However, a component that is a master for one link may be a slave for another link. Similarly, a component that is a slave for one link may be a master for another link. A component may be a master or a slave for multiple links.

In one embodiment, when a master component determines that a point-to-point link may enter the low power state, the master component may send a single request message over the link to the slave component. In one embodiment, the master component may not transmit additional data until a response to the request message is received. If the master component receives a CRC Error, the master component may go through a link-level retry to get a valid response.

When a slave component receives the request message, the slave component may determine whether transition to the low power state is appropriate. If so, the slave component may send an acknowledge (ACK) message to the master component. In one embodiment, the slave component may also send request messages over all links for which the component is a master component. That is, when a slave component agrees for a link to enter the low power state, that component may request all links for which it is a master component to also enter the low power state. Therefore, it is possible for a component to have two point-to-point links, one of which is in an active state and the other of which is in a low power state.

In one embodiment, in order to prevent request messages from being denied by a slave component and immediately retried by the master component, the master component may have an interval timer (or other mechanism) to prevent another request (or retry of the request) from happing for a predetermined period of time. This negotiation process may simplify transition to a low power by, among other things, not having conflicting requests to transition to the low power state from two components.

While the master device may initiate the transition from the active state to the low power state, the conditions used to initiate the transition may be the same conditions used by a slave device to determine whether to send an ACK message. That is, the condition that may cause the master device to send the request message may be the same as the condition that may cause the slave device to send the ACK message. In such an embodiment, if the conditions corresponding to the master and slave devices do not satisfy the same criteria, the link will not transition from the active state to the low power state.

FIG. 1 is a block diagram of one embodiment of an apparatus for a physical interconnect. In one aspect, the apparatus depicts a physical layer for a cache-coherent, link-based interconnect scheme for a processor, chipset, and/or IO bridge components. For example, the physical interconnect may be performed by each physical layer of an integrated device.

Specifically, the physical layer may provide communication between two ports over a physical interconnect comprising two uni-directional links. Specifically, one uni-directional link 104 from a first transmit port 150 of a first integrated device to a first receiver port 150 of a second integrated device. Likewise, a second uni-directional link 106 from a first transmit port 150 of the second integrated device to a first receiver port 150 of the first integrated device. However, the claimed subject matter is not limited to two uni-directional links.

Figure 2:
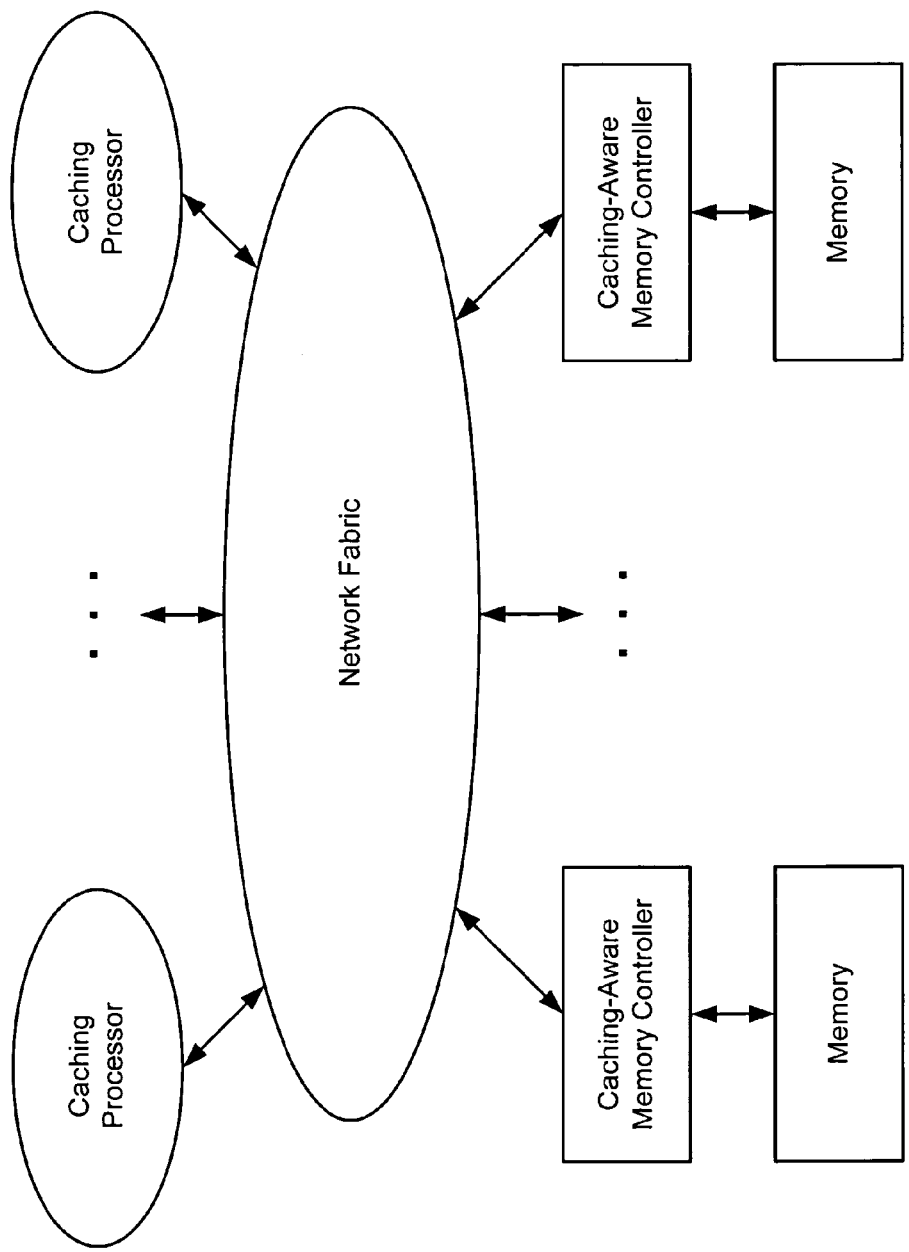
FIG. 2 is a conceptual illustration of one embodiment of a system that may utilize point-to-point interconnects.

FIG. 2 is a conceptual illustration of one embodiment of a system that may utilize point-to-point interconnects. In one embodiment, the system of FIG. 2 may utilize a point-to-point architecture that supports a layered protocol scheme. In one embodiment, the system may include a plurality of caching agents and home agents coupled to a network fabric. For example, the network fabric may adhere to a layered protocol scheme and comprised of: a physical layer, a link layer, a routing layer, a transport layer and a protocol layer (as depicted in connection with FIG. 1). The fabric may facilitate transporting messages from one protocol (home or caching agent) to another protocol for a point-to-point network.

FIG. 2 is a high level, simplified abstraction of a protocol architecture that may utilize one or more point-to-point links. The fabric may facilitate transporting messages from one protocol (caching processor or caching aware memory controller) to another protocol for a point-to-point network. Each caching-aware memory controller may be coupled with memory that may include, for example, dynamic random access memory (DRAM), flash memory, or any other type of memory known in the art.

Figure 3:
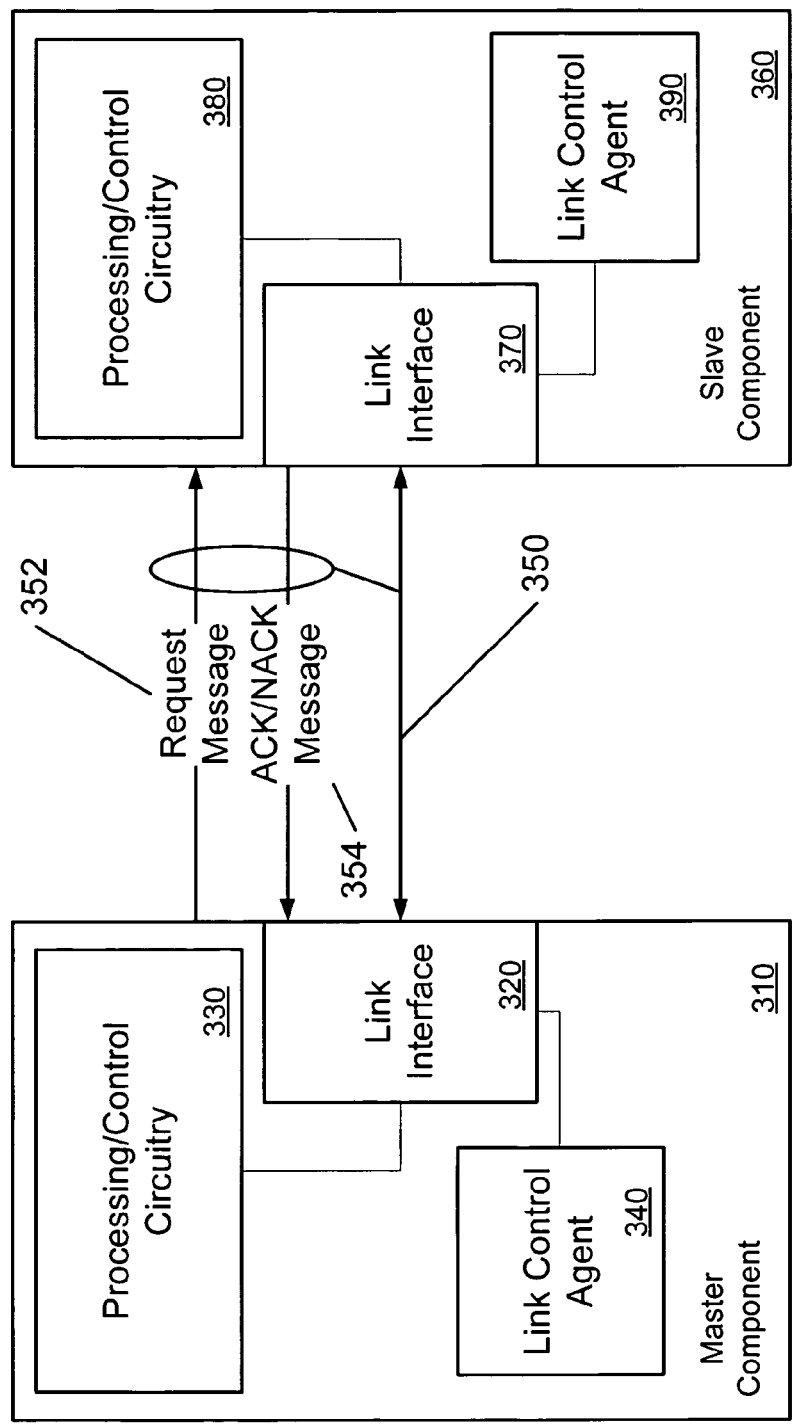
FIG. 3 is a block diagram of one embodiment of a master component coupled with a slave component via a point-to-point link.

FIG. 3 is a block diagram of one embodiment of a master component coupled with a slave component via a point-to-point link. In one embodiment, the link illustrated in FIG. 3 includes two uni-directional links as described above. The components of FIG. 3 may be any type of components within an electronic system. For example, the components may be processors, memory controllers, node controllers, input/putout hubs, chip sets, or any combination thereof. The host electronic system may include any number of components in addition to those illustrated in FIG. 3.

Master component 310 may operate as a master for the purposes of operational state control of link 350. Master component 310 may or may not function as a master for other types of interactions within the electronic system. Similarly, slave component 360 may operate as a slave for purposes of operational state control of link 350. Slave component 360 may or may not function as a slave for other types of interactions within the electronic system.

Master component 310 may be any type of component within an electronic system, for example, a processor. Master component 310 may include processing/control circuitry 330 that may provide the desired functionality of master component 310. For example, if master component 310 is a processor, processing/control circuitry 330 may be a processor core.

In one embodiment, master component 310 may include link interface 320, which may be any type of interface between the circuitry of master component 310 and physical link 350. Similarly, slave component 360 may include a counterpart link interface 370. Link interface 370 may be coupled to processing/control circuitry 380 in slave component 360. If, for example, slave component 360 is a memory controller, processing/control circuitry 360 may be the control circuitry of the memory controller to cause memory operations to and from master component 310 to be performed utilizing a memory device (not illustrated in FIG. 3), which may be, for example, a dynamic random access memory, a static random access memory, etc.

In one embodiment, link control agent 340 may be communicatively coupled with link interface 320. Link control agent 340 may be implemented as hardware, software, firmware or any combination thereof. In one embodiment, link control agent may determine based, for example, on link conditions, system conditions and/or absence of data to be transmitted over link 350 by master component 310 that link 350 may be transitioned from an active state to a low power (e.g., inactive state). To initiate the transition from the active state to the low power state, link control agent 340 (or other agent within master component 310) may cause request message 352 to be transmitted to slave component 360.

Request message 352 may be in any format that allows master component 310 to communicate to slave component 360 an intention to transition link 350 from the active state to the low power state. In one embodiment, link control agent 340 may prevent traffic from master component 310 over link 350 until a response to request message 352 is received from slave component 360.

In response to request message 352, link control agent 390 may determine whether transitioning link 350 to the low power state is appropriate for slave component 360. Link control agent 390 may use any parameters to determine whether transitioning link 350 to the low power state is appropriate for slave component 360. For example, link control agent 290 may determine whether slave component 360 is or will be transmitting data over link 350 during a subsequent period of time. Other information, for example, the power state of slave component 360, system conditions, etc. may also be used to determine whether the transition is appropriate.

In one embodiment, link control agent 390 may cause either an acknowledge (ACK) message or negative acknowledge (NACK) message (generically illustrated as ACK/NACK message 354 in FIG. 3) to master component 310 over link 350. In one embodiment, an ACK message may allow transition of link 350 from the active state to the low power state. In one embodiment, a NACK message may disallow transition of link 350 from the active state to the low power state.

Link control agent 390 may use one or more operational parameters to determine whether to cause an ACK message or a NACK message to be transmitted to master component 310. In one embodiment, link control agent 390 may determine whether data will be transmitted over link 350 during a subsequent period of time (e.g., 1 sec, 2 sec, 50 ms). In another embodiment, link control agent 390 may evaluate other operational parameters internal to slave component 360, for example, the power state or a computational state of slave component 360 may be used. Any type operational parameter of slave component 360 may be utilized. In one embodiment, the same operational parameters may also be used by master component 310 to determine whether to transmit a request message.

In response to receiving the ACK message, link control agent 340 may cause link 350 to transition to the low power state. For example, link control agent 340 may cause power to be removed from transmit circuitry of link interface 320 and/or disable a link clock signal. In response to receiving the NACK message, link control agent 340 may trigger a timer or other mechanism to prevent a request message from being transmitted over link 350 for a predetermined period of time.

Figure 4:
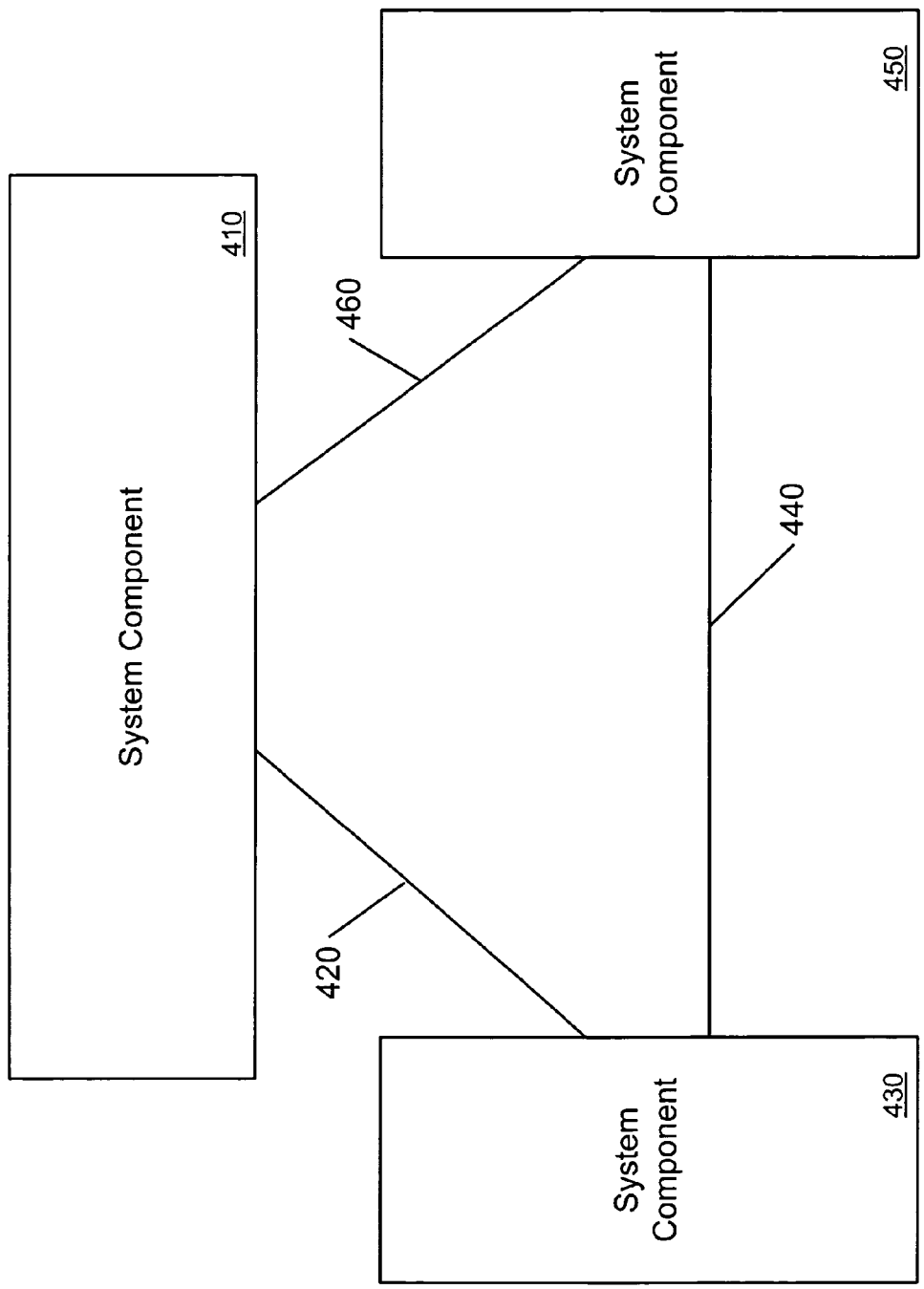
FIG. 4 is a block diagram of one embodiment of multiple system components interconnected by multiple point-to-point links.

FIG. 4 is a block diagram of one embodiment of multiple system components interconnected by multiple point-to-point links. In one embodiment, the components of FIG. 4 may include both the master component functionality and the slave component functionality described above. In the example of FIG. 4, system component 410 operates at the master on link 420 and the slave on link 460, system component 430 operates at the slave on link 420 and the master on link 440, and system component 450 operates as the slave on link 440 and the master on link 460. Other configurations with different master-slave designations and/or a different number of system components may also be supported.

System component 410 may determine conditions dictate that link 420 should transition to the low power state. In response, system component 410 may send a request message to system component 430 over link 420. In response to the request message from system component 410, system component 430 may send an ACK message or a NACK message to system component 410 over link 420 as described above.

In one embodiment, if system component 430, operating as a slave component on link 420, sends an ACK message to system component 410 to allow link 420 to transition to the low power state, system component 430 then sends a request message to system component 450 over link 440 to initiate a transition of link 440 to the low power state. System component 430 and system component 450 communicate over link 440 to determine wither link 440 will transition to the low power state using the negotiation technique described herein. The operational state of link 440 may not be dependent upon the operational state of link 420. That is, link 440 may be in a different state than link 420.

A similar negotiation process may also occur between system component 450 and system component 410 over link 460. System component 450 and system component 410 may determine the operational state of link 460. The operational state of link 460 may not be dependent upon the operational state of link 440. That is, link 460 may be in a different state than link 440. Thus, the operational state of multiple point-to-point links in a single electronic system may be determined utilizing the master-slave operation described herein for each link.

Reference in the specification to "one embodiment" or "an embodiment" means that a particular feature, structure, or characteristic described in connection with the embodiment is included in at least one embodiment of the invention. The appearances of the phrase "in one embodiment" in various places in the specification are not necessarily all referring to the same embodiment.

While the invention has been described in terms of several embodiments, those skilled in the art will recognize that the invention is not limited to the embodiments described, but can be practiced with modification and alteration within the spirit and scope of the appended claims. The description is thus to be regarded as illustrative instead of limiting.

What is claimed is:

1. An apparatus comprising:
a physical point-to-point link within an electronic system having a cache-coherent, link-based interconnect fabric;
a first component within the electronic system coupled with a first end of the point-to-point link, the first component to transmit a request over the point-to-point link to initiate transition of the point-to-point link from an active state to a low power state, the first component to operate as a master device in a power control negotiation, wherein the point-to-point link is to be incapable of transmitting packets during the low power state; and
a second component within the electronic system coupled with a second end of the point-to-point link, the second component, in response to the request, to selectively allow or disallow the transition of the point-to-point link from the active state to the low power state, wherein the second component sends negative acknowledge (NACK) message to disallow the transition of the point-to-point link from the active state to the low power state, and further wherein the first component maintains the point-to-point link in the active state in response to the NACK message, the second component to operate as a slave device in the power control negotiation, wherein no pending transactions or subsequent transactions are to occur within an upcoming period of time.

2. The apparatus of claim 1 wherein the second component sends an acknowledge message to allow the transition of the point-to-point link from the active state to the low power state, and further wherein the first component causes the point-to-point link to enter the low power state in response to the acknowledge message.

3. The apparatus of claim 1 wherein the first component does not reissue the request message for at least a predetermined period of time after receiving the NACK message from the second component.

4. The apparatus of claim 1 further comprising:
a second physical point-to-point link within the cache-coherent, link-based interconnect fabric of the electronic system;
the first component within the electronic system coupled with a first end of the second point-to-point link, the first component to transmit a second request over the second point-to-point link to initiate transition of the second point-to-point link from an active state to a low power state; and
a third component within the electronic system coupled with a second end of the second point-to-point link, the third component, in response to the second request, to selectively allow or disallow the transition of the second point-to-point link from the active state the low power state.

5. The apparatus of claim 1 further comprising:
a second physical point-to-point link within the cache-coherent, link-based interconnect fabric of the electronic system;
a third component within the electronic system coupled with a first end of the second point-to-point link, the third component to transmit a second request over the second point-to-point link to initiate transition of the second point-to-point link from an active state to a low power state; and
the first component within the electronic system coupled with a second end of the second point-to-point link, the first component, in response to the request, to selectively allow or disallow the transition of the second point-to-point link from the active state the low power state, wherein the first component is to operate as a slave device in power control negotiation for the second point-to-point link.

6. A system comprising:
a physical point-to-point link within an electronic system having a cache-coherent, link-based interconnect fabric;
a first component within the electronic system coupled with a first end of the point-to-point link, the first component to transmit a request over the point-to-point link to initiate transition of the point-to-point link from an active state to a low power state, the first component to operate as a master device in a power control negotiation, wherein the link is to be incapable of transmitting packets during the low power state;
a second component within the electronic system coupled with a second end of the point-to-point link, the second component, in response to the request, to selectively allow or disallow the transition of the point-to-point link from the active state to the low power state, wherein the second component sends negative acknowledge (NACK) message to disallow the transition of the point-to-point link from the active state to the low power state, and further wherein the first component maintains the point-to-point link in the active state in response to the NACK message, the second component to operate as a slave device in the power control negotiation, wherein no pending transactions or subsequent transactions are to occur within an upcoming period of time; and
a dynamic random access memory coupled with the second component.

7. The system of claim 6 wherein the second component sends an acknowledge message to allow the transition of the point-to-point link from the active state to the low power state, and further wherein the first component causes the point-to-point link to enter the low power state in response to the acknowledge message.

8. The system of claim 6 wherein the first component does not reissue the request message for at least a predetermined period of time after receiving the NACK message from the second component.

9. The system of claim 6 further comprising:
a second physical point-to-point link within the cache-coherent, link-based interconnect fabric of the electronic system;
the first component within the electronic system coupled with a first end of the second point-to-point link, the first component to transmit a second request over the second point-to-point link to initiate transition of the second point-to-point link from an active state to a low power state; and
a third component within the electronic system coupled with a second end of the second point-to-point link, the third component, in response to the second request, to selectively allow or disallow the transition of the second point-to-point link from the active state the low power state.

10. The system of claim 6 further comprising:
a second physical point-to-point link within the cache-coherent, link-based interconnect fabric of the electronic system;
a third component within the electronic system coupled with a first end of the second point-to-point link, the third component to transmit a second request over the second point-to-point link to initiate transition of the second point-to-point link from an active state to a low power state; and
the first component within the electronic system coupled with a second end of the second point-to-point link, the first component, in response to the request, to selectively allow or disallow the transition of the second point-to-point link from the active state the low power state, wherein the first component is to operate as a slave device in power control negotiation for the second point-to-point link.

11. A method comprising:
transmitting a request message from a master component of an electronic system to a slave component of the electronic system having a cache-coherent, link-based interconnect fabric over a physical point-to-point link, the request to initiate transition of the point-to-point link from an active state to a low power state;
receiving a response message from the slave component with the master component, the response message being either an acknowledge (ACK) message to allow transition from the active state to the low power state or a negative acknowledge (NACK) message to disallow transition from the active state to the low power state, the master component and the slave component to negotiate power level changes, where the negotiation is to ensure that no pending transactions or subsequent transactions occur within an upcoming period of time; and
causing the point-to-point link to transition to the low power state in response to receiving the ACK message from the slave device, wherein no packets are to be transmitted over the point-to-point link during the low power state.

12. The method of claim 11 further comprising:
determining, with the master component, whether the master component will transmit data over the point-to-point link during an upcoming period of time; and
causing the request message from the master device to the slave device if the master component is not to transmit data during the upcoming period of time.

13. The method of claim 11 wherein causing the point-to-point link to transition to the low power state in response to receiving the ACK message from the slave device in response to receiving the ACK message comprises causing a clock signal and/or a supply voltage for the point-to-point link to be disabled.

14. The method of claim 11 further comprising preventing reissue of the request message for a predetermined period of time after receiving the NACK message.

15. The method of claim 14 further comprising reissuing the request message before the predetermined period of time if a transmission error occurs.

16. A method comprising:
receiving, with a slave component within an electronic system, a request message from a master component within the electronic system having a cache-coherent, link-based interconnect fabric over a point-to-point link, the request to initiate transition of the point-to-point link from an active state to a low power state, wherein no packets are to be transmitted over the point-to-point link during the low power state;
determining whether to respond to the request message with an acknowledge (ACK) message to allow transition from the active state to the low power state or to respond to the request with a negative acknowledge (NACK) message to disallow transition from the active state to the low power state, the master component and the slave component to negotiate power level changes, where the negotiation is to ensure that no pending transactions or subsequent transactions occur within an upcoming period of time; and transmitting either the ACK message or the NACK message to the master component over the point-to-point link.

17. The method of claim 16 further comprising sending, from the slave component, a request message corresponding to each additional point-to-point link, if any, for which the slave component is a master.

18. The method of claim 16 further comprising:
    determining, with the slave component, whether the slave component will transmit data over the point-to-point link during an upcoming period of time; and
    causing the ACK message to be transmitted from the slave device to the master device if the slave component is not to transmit data during the upcoming period of time.

19. The method of claim 16 further comprising:
    determining, with the slave component, whether the slave component will transmit data over the point-to-point link during an upcoming period of time; and
    causing the NACK message to be transmitted from the slave device to the master device if the slave component is to transmit data during the upcoming period of time.

20. The method of claim 16 further comprising:
    evaluating one or more operational parameters of the slave component; and
    causing either a NACK message or an ACK message to be transmitted to the master device based on the evaluation of the operational parameters of the slave components.

* * * * *

UNITED STATES PATENT AND TRADEMARK OFFICE
CERTIFICATE OF CORRECTION

PATENT NO. : 9,813,998 B2  
APPLICATION NO. : 13/042104  
DATED : November 7, 2017  
INVENTOR(S) : Shaun M. Conrad, Robert J. Safranek and Selim Bilgin Page 1 of 1

It is certified that error appears in the above-identified patent and that said Letters Patent is hereby corrected as shown below:

In the Claims

In Column 6 Line 48, in Claim 4, after "state" insert -- to --.

In Column 6 Line 64, in Claim 5, after "state" insert -- to --.

In Column 7 Line 54, in Claim 9, after "state" insert -- to --.

In Column 8 Line 3, in Claim 10, after "state" insert -- to --.

Signed and Sealed this  
Twenty-third Day of January, 2018

Joseph Matal  
*Performing the Functions and Duties of the*  
*Under Secretary of Commerce for Intellectual Property and*  
*Director of the United States Patent and Trademark Office*